United States Patent [19]

Sherman

[11] Patent Number: 4,996,911
[45] Date of Patent: Mar. 5, 1991

[54] BUTTER DISPENSING UNIT FOR USE WITH A HOT AIR POPCORN POPPER

[76] Inventor: Barry S. Sherman, 1473 Halekoa Dr., Waialae, Hi. 96821-1150

[21] Appl. No.: 468,279

[22] Filed: Jan. 22, 1990

[51] Int. Cl.⁵ ............................................. A23L 1/18
[52] U.S. Cl. .................................... 99/323.8; 118/13; 426/307
[58] Field of Search .................. 49/323.8, 323.9, 323.5, 49/323.6, 323.7, 323.11; 426/445, 523, 307, 309; 118/13, 14, 20, 16

[56] References Cited

U.S. PATENT DOCUMENTS

| | | | |
|---|---|---|---|
| 3,722,399 | 3/1973 | Cole | 99/323.8 |
| 4,512,247 | 4/1985 | Friedman | 99/323.8 |
| 4,942,277 | 7/1990 | Narberes | 99/323.8 |

*Primary Examiner*—Robert W. Jenkins
*Attorney, Agent, or Firm*—Michael I. Kroll

[57] ABSTRACT

A butter dispensing unit is provided for use with a hot air popcorn popper having an exit chute. The unit consists of a perforated housing for holding butter therein and a structure for removably disposing the perforated housing at the front of the exit chute of the popcorn popper. Hot air coming out of the exit chute will melt the butter in the perforated housing and mix with the popcorn also coming out of the exit chute.

6 Claims, 1 Drawing Sheet

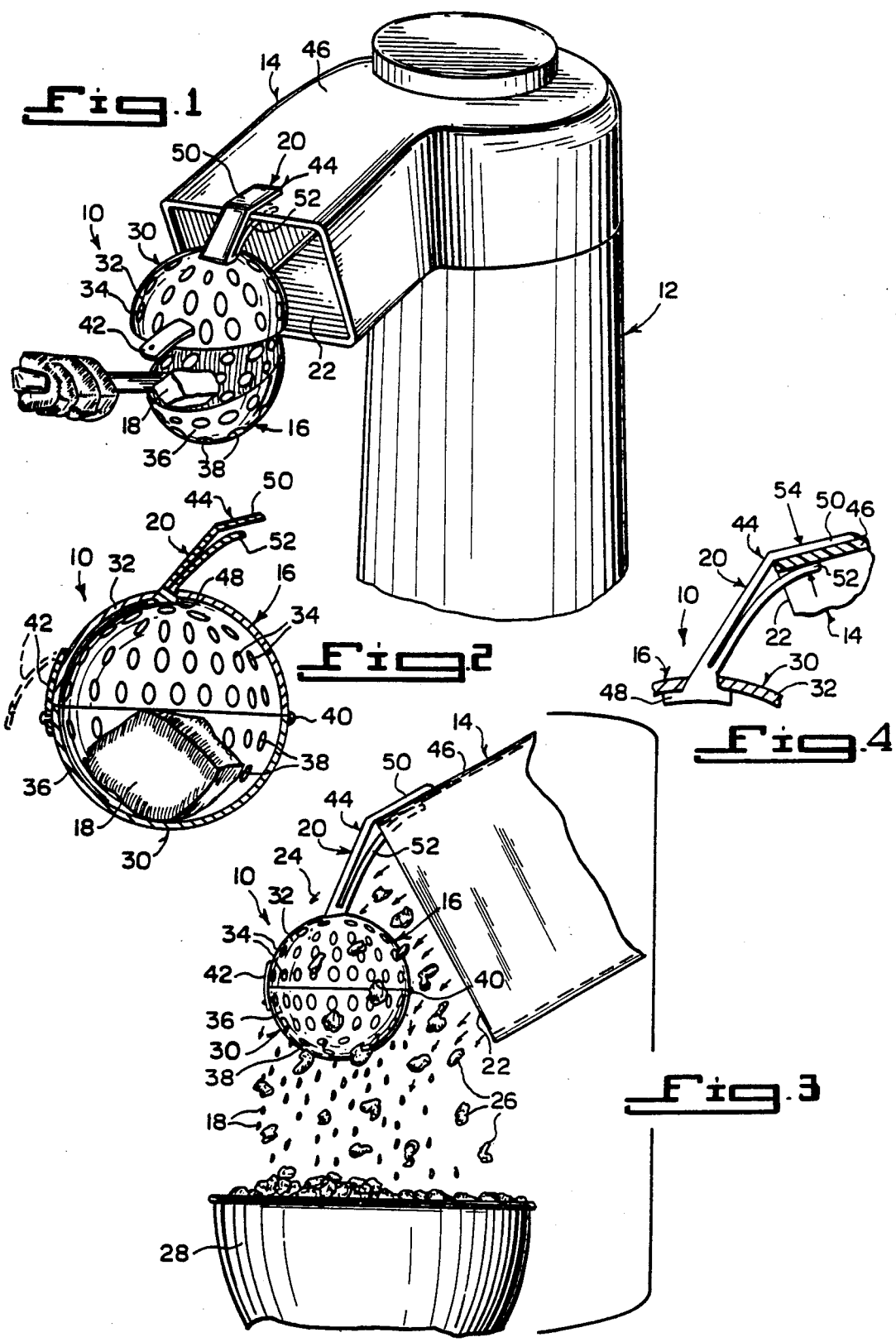

BUTTER DISPENSING UNIT FOR USE WITH A HOT AIR POPCORN POPPER

BACKGROUND OF THE INVENTION

1. Field of the Invention

The instant invention relates generally to perforated infusion devices and more specifically it relates to a butter dispensing unit for use with a hot air popcorn popper. 2. Description of the Prior Art

2. Description of the Prior Art

Numerous perforated infusion devices have been provided in prior art that are adapted to mix extractive beverage making ingredients into a liquid. For example U.S. Pat. Nos. 1,677,397 to Mock; 3,946,652 to Gorin and 4,338,338 to Popkes all are illustrative of such prior art. While these units may be suitable for the particular purpose to which they address, they would not be as suitable for the purposes of the present invention as heretofore described.

SUMMARY OF THE INVENTION

A primary object of the present invention is to provide a butter dispensing unit for use with a hot air popcorn popper that will overcome the shortcomings of the prior art devices.

Another object is to provide a butter dispensing unti for use with a hot air popcorn popper is disposed at the front of the exit chute of the popcorn popper so that the hot air coming out of the exit chute will melt the butter to mix with the popcorn also coming out of the exit chute.

An additional object is to provide a butter dispensing unit that is a perforated ball shaped container which will open to receive the butter therein and be removably attached to the upper front portion of the exit chute of the popcorn popper so as to hang down into the path of the hot air and popcorn coming out of the exit chute.

A further object is to provide a butter dispensing unit for use with a hot air popcorn popper that is simple and easy to use.

A still further object is to provide a butter dispensing unit for use with a hot air popcorn popper that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of the invention opened to receive butter and attached onto an exit chute of a popcorn popper.

FIG. 2 is a cross sectional view of the invention closed with butter therein.

FIG. 3 is a side view of the invention on the exit chute of the popcorn popper allowing the mixing of melted butter with the hot popcorn exiting therefrom.

FIG. 4 is an enlarged side view of the clamp member shown removably attached to the upper front portion of the exit chute.

DETAILED DESCRIPTION OF THE PREFERRED EMBODIMENTS

Turning now descriptively to the drawings, in which similar reference characters denote similar elements throughout the several views, FIGS. 1 through 4 illustrates a butter dispensing unit 10 for use with a hot air popcorn popper 12 having an exit chute 14. The unit 10 consists of a perforated housing 16 for holding butter 18 therein and a structure 20 for removably disposing the perforated housing 16 at the front 22 of the exit chute 14 of the popcorn popper 12. Hot air 24 coming out of the exit chute 14 will melt the butter 18 in the perforated housing 16 and mix with the popcorn 26 also coming out of the exit chute 14 which may enter a bowl 28 or the like.

The perforated housing 16 is a ball shaped container 30 which includes an upper hollow hemispheric portion 32 having a plurality of apertures 34 therein and a lower hollow hemispheric portion 36 having a plurality of apertures 38 therein. A hinge 40 is at one side between the upper hollow hemispheric portion 32 and the lower hemispheric portion 36 so that the ball shaped container 30 can be placed in an open position and a closed position. A latch member 42 is at an opposite side from the hinge 40 between the upper hollow hemispheric portion 32 and the lower hollow hemispheric portion 36 so that after the butter 18 is placed therein the latch member 42 can secure the ball shaped container 30 in the closed position.

The removably disposing structure 20 is a clamp member 44 on the top of the upper hollow hemispheric portion 32 of the ball shaped container 30 which attaches to an upper wall 46 at the front 22 of the exit chute 14 of the popcorn popper 12. The ball shaped container will hang down into the path of the hot air 24 and popcorn 26 coming out of the exit chute 14 of the popcorn popper 12.

The clamp member 44 includes a flange 48 which fits into and holds the top of the upper hollow hemispheric portion 32 of the ball shaped container 30. A first bent arm 50 extends away from the flange 48 to fit over the upper wall 46 at the front 22 of the exit chute 14 of the popcorn popper 12. A second curved arm 52 is below the first bent arm 50 and extends away from the flange 48 to fit under the upper wall 46 at the front 22 of the exit chute 14 of the popcorn popper 12. A spring clamping force 54 is provided between the first bent arm 50 and the second curved arm 52 to removably hold the clamp member 44 to the upper wall 46 at the front 22 of the exit chute 14 of the popcorn popper 12.

To use the butter dispensing unit 10, a person places the butter 18 into the lower hollow hemispheric portion 36 of the ball shaped container 30 that is hanging down on the exit chute 14 by the clamp member 44, as shown in FIG. 1. The ball shaped container 30 is then closed and secured by the latch mechanism 42 as shown in FIG. 2. The hot air 24 coming out of the exit chute 14 will melt the butter 18 so that it will mix with the popcorn 26 also coming out of the exit chute 14 as shown in FIG. 3.

LIST OF REFERENCE NUMBERS

10: butter dispensing unit
12: hot air popcorn popper
14: exit chute
16: perforated housing
18: butter 20: removably disposing structure
22: front of 14
24: hot air
26: popcorn
28: bowl
30: ball shaped container
32: upper hollow hemispheric portion
34: aperture in 32
36: lower hollow hemispheric portion
38: aperture in 36
40: hinge
42: latch member
44: clamp member
46: upper wall of 14
48: flange on 44
50: first bent arm
52: second curved arm
54: spring clamping force.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details fo the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A butter dispensing unit for use with a hot air popcorn popper having an exit chute, said unit comprising:
   (a) a perforated housing for holding butter therein; and
   (b) means for removably disposing said perforated housing at the front of the exit chute of the popcorn popper so that hot air coming out of the exit chute will melt the butter in said perforated housing and mix with the popcorn also coming out of the exit chute, wherein said perforated housing is a ball shaped container.

2. A butter dispensing unit as recited in claim 1, wherein said ball shaped container includes:
   (a) an upper hollow hemispheric portion having a plurality of apertures therein; and
   (b) a lower hollow hemispheric portion having a plurality of apertures therein.

3. A butter dispensing unit as recited in claim 2, further including a hinge at one side between said upper hollow hemispheric portion and said lower hollow hemispheric portion so that said ball shaped container can be placed in an open position and a closed position.

4. A butter dispensing unit as recited in claim 3, further including a latch member at an opposite side from said hinge between said upper hollow hemispheric portion and said lower hollow hemispheric portion so that after the butter is placed therein said latch member can secure said ball shaped container in the closed position.

5. A butter dispensing unit as recited in claim 4, wherein said removably disposing means is a clamp member on the top of said upper hollow hemispheric portion of said ball shaped container which attaches to an upper wall at the front of the exit chute of the popcorn popper so that said ball shaped container will hang down into the path of the hot air and popcorn coming out of the exit chute of the popcorn popper.

6. A butter dispensing unit as recited in claim 5, wherein said clamp member includes:
   (a) a flange which fits into and holds the top of said upper hollow hemispheric portion of said ball shaped container;
   (b) a first bent arm extending away from said flange to fit over the upper wall at the front of the exit chute of the popcorn popper; and
   (c) a second curved arm below said first bent arm extending away from said flange to fit under the upper wall at the front of the exit chute of the popcorn popper whereby a spring clamping force is provided between said first bent arm and said second curved arm to removably hold said clamp member to the upper wall at the front of the exit chute of the popcorn popper.

* * * * *